United States Patent Office 3,457,193
Patented July 22, 1969

1

3,457,193
EPOXYOXACYCLOBUTANES AND POLYMERS THEREOF
Samuel W. Tinsley, Charleston, W. Va., and Paul A. King, Warwick, N.Y., assignors to Union Carbide Corporation, a corporation of New York
No Drawing. Filed June 30, 1965, Ser. No. 468,586
Int. Cl. C08g 23/06, 23/14; C07d 21/00
U.S. Cl. 260—2       12 Claims

ABSTRACT OF THE DISCLOSURE

The invention relates to novel epoxyoxacyclobutanes containing at least one epoxy group in a side chain substituent. The compounds can be polymerized to produce polymers and the resulting epoxide polymers are useful for producing molded articles, in coatings and in the preparation of laminated structures.

---

This invention relates to novel oxetanes. More particularly it is concerned with epoxyoxetane or epoxyoxacyclobutane compounds and the polymers thereof.

The epoxyoxacyclobutanes of this invention are represented by generic Formula I

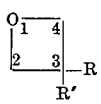

wherein R, when taken singly, is a hydrogen atom, a linear or branched alkyl radical containing from 1 to about 8 carbon atoms, preferably from 1 to 4 carbon atoms, a linear or branched hydroxyl-substituted alkyl radical containing from 1 to about 8 carbon atoms, preferably from 1 to 4 carbon atoms, a linear or branched alkenyl radical containing from 2 to about 8 carbon atoms, preferably from 2 to 4 carbon atoms, an alkenyloxyalkyl radical of the formula $C_nH_{2n}$—O—$C_mH_{2m}$—, an epoxyalkyl radical of the formula

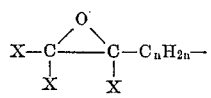

or an epoxyalkyloxyalkyl radical of the formula

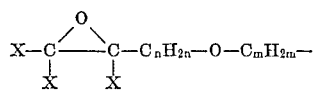

X is a hydrogen atom, an unsubstituted or substituted linear or branched alkyl radical containing from 1 to about 8 carbon atoms, preferably from 1 to 4 carbon atoms, an unsubstituted or substituted cycloalkyl radical containing 5 or 6 ring carbon atoms, or an unsubstituted or substituted aryl radical; such as naphthyl or phenyl; $p$ is an integer having a value of from 0 to about 8; $n$ is an integer having a value of from 1 to about 8; $m$ is an integer having a value of from 1 to about 4; R' when taken singly, is an epoxyalkyl radical or an epoxyalkoxyalkyl radical as defined above; and R and R', when taken jointly, are an epoxycycloalkyl containing 5 or 6 ring carbon atoms or a three-membered oxirane ring formed with the oxacyclobutane ring carbon atom in the 3-position thereof.

Included within the scope of Formula I are the following classes of compounds represented by subgeneric Formulae II to VIII, inclusive.

2

The oxacyclobutanes containing only one epoxyalkyl group of the formula

II 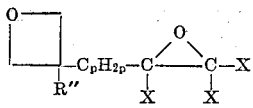

wherein R" is a hydrogen atom, a linear or branched alkyl radical having from 1 to about 8 carbon atoms, preferably from 1 to 4 carbon atoms, a linear or branched hydroxyl-substituted alkyl radical having from 1 to about 8 carbon atoms, preferably from 1 to 4 carbon atoms, or a linear or branched alkenyl radical having from 2 to about 8 carbon atoms, preferably from 2 to 4 carbon atoms. Illustrative thereof one can mention:

3-epoxyethyloxacyclobutane,
3-(2,3-epoxypropyl)oxacyclobutane,
3-(2,3-epoxyhexyl)oxacyclobutane,
3-(2,3-epoxy-2-methylpropyl)oxacyclobutane,
3-epoxyethyl-3-methyloxacyclobutane,
3-(2,3-epoxypropyl)-3-octyloxacyclobutane,
3-(2,3-epoxypropyl)-3-methyloloxacyclobutane,
3-(4,5-epoxypentyl)-3-butyloloxacyclobutane,
3 - (2,3-epoxy-2-methylpropyl)-3-allyloxacyclobutane and the like.

Among the starting materials that can be used to produce the oxacyclobutane compounds of Formula II one can mention:

5-vinyl-1,3-dioxan-2-one,
5-allyl-1,3-dioxan-2-one,
5-(2-hexenyl)-1,3-dioxan-2-one,
5-methallyl-1,3-dioxan-2-one,
5-vinyl-5-methyl-1,3-dioxan-2-one,
5-allyl-5-methylol-1,3-dioxan-2-one,
5,5-diallyloxy-1,3-dioxan-2-one and the like.

The epoxy oxycyclobutanes compounds corresponding to Formula II can be produced by the pyrolysis of a 1,3-dioxane compound, followed by epoxidation with, preferably, peracetic acid. The specific reaction conditions for the separate reactions will vary depending upon the starting materials; however, one skilled in the art would experience little or no difficulty in light of the teachings herein. The reactions can be illustrated by the following equations:

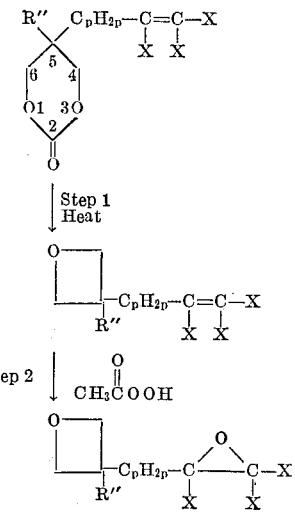

Step 1 is carried out at from about 170° C. up to that temperature at which little or no additional decomposition takes place. Step 2 is preferably conducted at from about —25° C. to 150° C. The pressure can be from subatmospheric to superatmospheric; and, if desired one can have present any of the known inert, organic solvents such as mineral oil, the vegetable oils, soybean oil, the high boiling esters such as dioctylphthalate or didecyl phthalate, and the like.

The epoxy oxacyclobutanes containing only one epoxyalkyloxyalkyl group of the formula

III

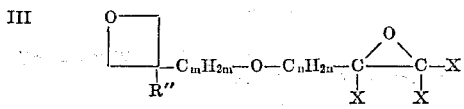

Illustrative thereof one can mention:

3-(2,3-epoxypropoxymethyl)oxacyclobutane,
3-(2,3-epoxybutoxypropyl)oxacyclobutane,
3-(2,3-epoxy-2-methylpropoxymethyl)oxacyclobutane,
3-(2,3-epoxy-2-methylpropoxybutyl)-3-ethyloxacyclobutane,
3-(2,3-epoxy-2-methylpropoxymethyl)-3-octyloxacyclobutane,
3-(2,3-epoxy-2-methylpropoxymethyl)-3-methyloloxacyclobutane,
3-(2,3-epoxy-2-methylpropoxymethyl)-3-allyloxacyclobutane,
3-(2,3-epoxy-2-methylpropoxymethyl)-3-(2-methyl-2-propenyl)oxacyclobutane
3-(2,3-epoxypropoxymethyl)-3-methyloloxacyclobutane
3-(2,3-epoxypropoxy-2-ethylhexyl)-3-(4-pentenyl)oxacyclobutane, and the like.

Among the starting materials that can be used to produce the oxacyclobutanes of Formula III one can mention:

5-allyloxymethyl-1,3-dioxan-2-one,
5-(2-butenyloxypropyl)-1,3-dioxan-2-one,
5-methallyloxybutyl-1,3-dioxan-2-one,
5-allyl-5-allyloxymethyl-1,3-dioxan-2-one,
5-(2-methyl-2-propenyl)-5-allyloxymethyl-1,3-dioxan-2-one,
5-(pent-4-enyl)-5-(allyloxyhexyl)-1,3-dioxan-2-one
and the like.

The compounds of the class represented by Formula III are readily prepared by the pyrolysis of a 1,3-dioxane compound, followed by a condensation reaction, and finally epoxidation with, preferably, peracetic acid. The reactions can be represented by the following equations:

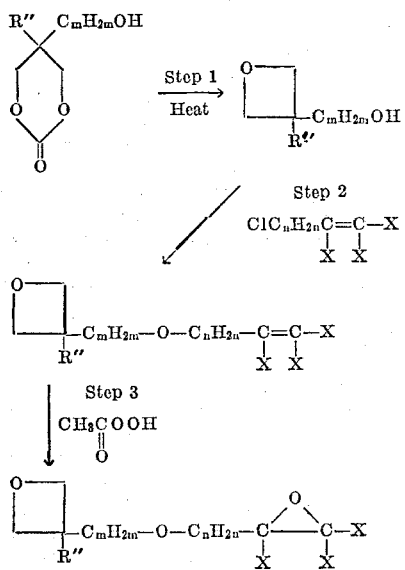

As would be obvious, one can use the bromo, fluoro, or iodo derivatives in condensation step 2 in place of the chloro compound shown, in any of the synthesis discussed in this specification.

The epoxy oxacyclobutanes wherein R and R', when taken jointly, form compounds having an epoxycycloalkyl spiro ring of the formula

IV

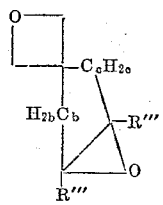

wherein R''' is a hydrogen atom, a linear or branched alkyl radical having from 1 to about 8 carbon atoms, preferably from 1 to 4 carbon atoms, or an aryl radical; and the sum of $b$ plus $c$ is an integer having a value of from 1 to 3. Illustrative thereof one can mention:

7,8-epoxyspiro[3,5]-2-oxanonane,
7,8-epoxy-7-methylspiro[3,5]-2-oxanonane,
7,8-epoxy-8-phenylspiro[3,5]-2-oxanonane,
6,7-epoxyspiro[3,4]-2-oxaoctane,
7,8-epoxy-7,8-dimethylspiro[3,5]-2-oxanonane
and the like.

Among the starting materials that can be used to produce the spiro oxacyclobutanes of Formula IV one can mention:

Spiro[3,5]-2-oxa-7-nonene,
8-phenylspiro[3,5]-2-oxa-7-nonene,
Spiro[3,4]-2-oxa-6-octene,
7,8-dimethylspiro[3,5]-2-oxa-7-nonene
and the like.

The spiro type epoxy compounds can be produced by the reaction of a cycloalkenyl gem-diol followed by epoxidation of the product as shown by the following reaction sequence:

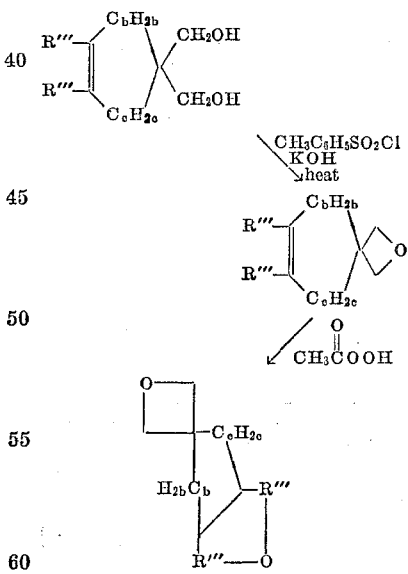

The epoxy oxacyclobutanes wherein R and R', when taken jointly, form a three-membered oxirane ring of the formula

V

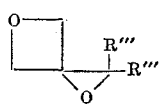

Illustrative thereof one can mention:

Spiro[2,3]-1,5-dioxahexane,
2-methylspiro[2,3]-1,5-dioxahexane,
2,2-dimethylspiro[2,3]-1,5-dioxahexane,
2-(2-ethylhexyl)spiro[2,3]-1,5-dioxahexane and the like.

Compounds corresponding to Formula V can be prepared with the following as starting materials:

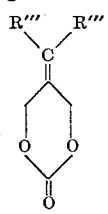

Among the suitable starting materials one can mention:

5-methylene-1,3-dioxan-2-one,
5-allyl-1,3-dioxan-2-one,
5-methallyl-1,3-dioxan-2-one and the like.

The diepoxy oxacyclobutanes containing two epoxyalkyl groups of the formula

VI

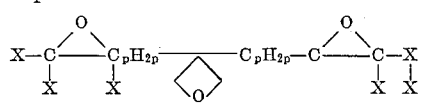

Illustrative thereof one can mention:

3,3-di(2,3-epoxypropyl)oxacyclobutane,
3,3-di(2,3-epoxy-2-methylpropyl)oxacyclobutane,
3-(2,3-epoxypropyl)-3-(2,3-epoxy - 2 - methylpropyl)oxacyclobutane and the like.

The diepoxy oxacyclobutanes containing two epoxyalkyloxyalkyl groups of the formula

VII

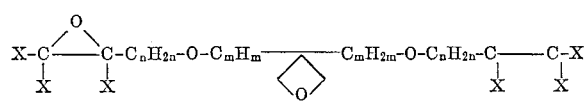

Illustrative thereof one can mention:

3,3-di(2,3-epoxypropoxymethyl)oxacyclobutane,
3,3-di(2,3-epoxy - 2 - methylpropoxymethyl)oxacyclobutane,
3-(2,3-epoxypropoxymethyl)-3-(2,3-epoxy - 2 - methylpropoxymethyl)oxacyclobutane and the like.

The diepoxy oxacyclobutanes containing both an epoxyalkyl group and an epoxyalkyloxyalkyl group of the formula

VIII

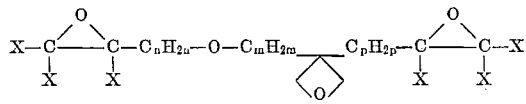

Illustrative thereof one can mention:

3-(2,3-epoxypropoxymethyl) - 3 - (2,3-epoxypropyl)oxacyclobutane,
3-(2,3-epoxypropoxymethyl)-3-(2,3-epoxy - 2 - methylpropyl)oxacyclobutane,
3-(2,3-epoxy - 2 - methylpropoxymethyl)-3-(2,3-epoxypropyl)oxacyclobutane,
3-(2,3-epoxy - 2 - methylpropoxymethyl)-3-(2,3-epoxy-2-methylpropyl)oxacyclobutane and the like.

For the oxacyclobutanes of Formula VI the starting material can be meta-dioxane compounds of the type:

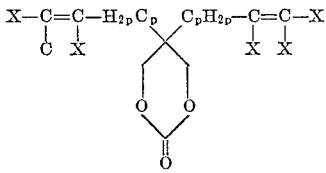

for those of Formula VII they would be:

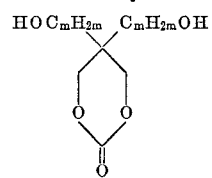

and for those of Formula VIII they would be:

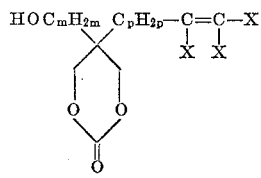

Among the compounds suitable for use as starting materials for producing the compounds of Formula VI one can mention:

5,5-diallyl-1,3-dioxan-2-one,
5,5-dimethallyl-1,3-dioxan-2-one,
5-allyl-5-methallyl-1,3-dioxan-2-one and the like.

Suitable starting materials for the compounds of Formula VII include:

5,5-diallyloxymethyl-1,3-dioxan-2-one,
5,5-dimethallyloxypropyl-1,3-dioxan-2-one,
5,5-dimethallyloxymethyl-1,3-dioxan-2-one,
5-allyloxymethyl-5-methallyloxymethyl-1,3-dioxan-2-one and the like.

Included among the starting materials suitable for use in producing the compounds of Formula VIII are:

5-allyloxymethyl-5-allyl-1,3-dioxan-2-one,
5-allyloxymethyl-5-methallyl-1,3-dioxan-2-one,
5-methallyloxymethyl-5-allyl-1,3-dioxan-2-one,
5-methallyloxymethyl-5-methallyl-1,3-dioxan-2-one,
5-allyloxypropyl-5-allyl-1,3-dioxan-2-one and the like.

The formation of the oxacyclobutane ring has been known for some time and many papers have been published thereon.

The above-described epoxy oxacyclobutanes can be used as chemical intermediates and, in addition, to produce resins which find utility as coatings, for producing laminates, as adhesives, in moldings and castings, etc. The uses to which epoxide resins can be put are well known to those skilled in the art. In addition, it is also known by those skilled in the art that fillers and pigments can be added to the thermoplastic resins and that they can be cured to produce thermoset resins.

The epoxy oxycyclobutane compounds can be polymerized by reaction of both the oxacyclobutane group and the epoxide linkage with each other or in the presence of a hardener. Those compounds which contain a polymerizable ethylenically unsaturated bond can, if desired, be polymerized by means of a free radical catalyst and then reaction of the oxacyclobutane group and the epoxide with each other or the hardener can be induced to form cross-links.

The polymerization is carried out in the presence of an acidic or basic catalyst at a temperature of from about 25° C., or lower, to about 250° C., or higher, for a period of time sufficient to produce the polymer. The polymers obtained range from soft to hard, tough resins.

The acidic and basic catalysts which can be employed in the polymerization reaction include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoridemonoethylamine complex, boron trifluoride-dimethyl ether complex, boron trifluoride-diethyl ether complex, boron trifluoride dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alpha-methylbenzyldimethylamine, dimethylethylamine, triethylamine, tripropylamine, trimethylammonium hydroxide, and the like.

Catalyst concentrations and polymerization temperatures have an effect on the polymerization rate, the higher concentrations and temperatures promoting faster reaction rates than the lower ones. The catalyst concentration can be varied over a broad range and can be selected on the basis of the rate of polymerization desired and the polymerization temperature to be used. It has been observed that a catalyst concentration in the range of from about 0.005 to 100 weight percent, desirably, from about 0.01 to 15 weight percent, based on the weight of epoxy oxacyclobutane can be used in forming useful polymeric products.

In other aspects, the invention is directed to novel curable, polymerizable compositions comprising the epoxy oxacyclobutane and an active organic hardener, and to the partially cured (fusible thermosetting intermediate reaction products) and cured resins resulting therefrom. The active organic hardeners illustrated hereinafter are employed in a curing amount, that is, an amount which is sufficient to cause the curable system comprising epoxy oxacyclobutane to become a thermosetting or thermoset copolymeric resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one active organic hardener or a mixture of active organic hardeners.

The curable compositions of the invention can be prepared by mixing the epoxy oxacyclobutane with the active organic hardener(s), preferably under agitation, so as to obtain a homogeneous mixture. The order of addition of the components does not appear to be critical. Heating is advantageous in facilitating the formation of a solution. The application of heat should not be prolonged to the extent that appreciable curing takes place.

The curable compositions of the invention can be partially cured or fully cured by maintaining the temperature in the range of from about 25° C., and lower to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes, the preferred minimum temperature of the normally solid curable compositions is that at which said compositions form a uniform melt, whereas for coatings and the preparation of laminates, the use of solvents will allow the use of lower temperatures.

The time for effecting the partial cure or the complete cure will be governed, to an extent, on several factors such as the particular active organic hardener(s) employed, the proportions of the epoxy oxacyclobutane and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from 10 minutes to 24 hours, depending upon the correlation of such factors as illustrated above.

If desired, basic or acidic catalyst such as those illustrated previously can be incorporated into the curable compositions of the invention to increase the cure rate and/or reduce the gelation period. It is generally suitable to add the catalyst to the curable composition which is maintained at a temperature in the range of from about 10° to 100° C. Agitation of the curable composition prior to, during, and after the incorporation of the catalyst is desirable to ensure a homogeneous mixture. Catalyst concentrations of the order described previously can be employed.

The organic hardeners suitable for use are well known and include, for example, oxalic acid, succinic acid, adipic acid, sebacic acid, maleic acid, itaconic acid, glutaconic acid isopropylidenemalonic acid, allylmalonic acid, thiodiglycolic acid, 3-hexenyldioic acid, phthalic acid, terephthalic acid, tetrahydrophthalic acid, 1,8-naphthalenedicarboxylic acid, 1,2,4-hexanetricarboxylic acid, 1,2,4-benzenetricarboxylic acid, phthalic anhydride, chlorendic anhydride, maleic anhydride, glutaric anhydride, octenylsuccinic anhydride, 1,8-naphthalic anhydride, tetrabromophthalic anhydride, ethylene glycol, diethylene glycol, the polyethylene glycols, propylene glycol, the polypropylene glycols, the polyethylenepropylene glycols, trimethylene glycol, 2-butene-1,4-diol, the pentanediols, the pentenediols, 12,13-tetracosanediol, glycerol, the cycloalkanediols, resorcinol, catechol, polyesters containing at least two free carboxyl groups in the average polymer chain, ethylamine, butylamine, 2-ethylhexylamine, monoisopropanolamine, propionamide, aniline, N-aminoethylmorpholine, ethylenediamine, nonylenediamine, dimethylurea, 1,4-naphthalenediamine, piperazine, polyethylene polyamine, and the like. The amount of organic hardener added will vary depending upon the particular one selected; this is a fact well known in the art. Ordinarily the amount thereof is such so as to provide from 0.1 to 5 of the reactive group (carboxyl, amino, hydroxyl, etc.), in the hardener per epoxy group. Generally the amount used is preferably within the range of from about 0.1 to about 2 reactive groups per epoxy group.

The following examples serve to further illustrate the invention but are not restrictive thereof.

EXAMPLE 1

A mixture of 747 grams of trimethylolpropane and 605 grams of diethylcarbonate was prepared in a three liter flask equipped with an eight inch column. A few small pieces of sodium were added and the temperature was slowly raised to 120° C. while permitting ethanol to distill over at a head temperature of 78° to 79° C. When the kettle temperature had reached 150° C. a vacuum system was attached to the column and the pressure in the reactor was maintained to permit constant distillation of the formed ethanol. A total of 480 grams, representing 95 percent conversion, of ethanol was removed. The pressure was then raised to 200 mm. and the kettle temperature increased to 180° C. Carbon dioxide evolved and 575 grams of crude 3-ethyl-3-methyloloxacyclobutane were recovered. This was distilled on a two foot packed column to yield 50 percent of the theoretical amount of 3-ethyl-3-methyloloxacyclobutane having a boiling point of 93° to 95° C. at 2 mm. mercury pressure and an $n_D^{30}$ of 1.4496.

To a mixture of 72.5 grams of a 50 percent solution of sodium hydride in mineral oil suspended in 500 ml. of tetrahydrofuran, there was added 185 g. of the above 3-ethyl-3-methyloloxacyclobutane in a dropwise manner over a one hour period. The reaction was exothermic and was accompanied by evolution of hydrogen. The mixture was refluxed for 2.5 hours and then 138 grams of methallyl chloride was added in a dropwise manner at the reflux temperature. After an additional 6 hours at reflux, 150 ml. of methanol was added to the reaction mixture to destroy any unreacted sodium hydride and the contents of the reaction flask were poured into 500 ml. of water. The organic layer was separated and the aqueous layer was acidified with concentrated hydrochloric acid and extracted five times with 200 ml. portions of diethyl ether. The ether extracts were combined with the organic layer and washed twice with 200 ml. portions of water. The ether solution was dried overnight over sodium carbonate, then filtered, the ether stripped off, and the 3-methallyloxymethyl)-3-ethyloxacyclobutane was recovered by vacuum distillation at 68° C. and a pressure of 3.5 mm. of mercury. The crude yield was 70 percent of theory. The distilled product had an $n_D^{30}$ of 1.4439 and a bromine number of 93; the theoretical bromine number is 94.

There were reacted 171 grams of 3-(methallyloxymethyl)-3-ethyloxacyclobutane and 309 grams of a 27.1 percent solution of peracetic acid in ethyl acetate at about 40° C. The reaction was continued at said temperature until it was essentially completed and the mixture was then fractionally distilled. A 77 percent yield of distilled 3-(2,3-epoxy - 2 - methylpropoxymethyl) - 3 - ethyloxacyclobutane was realized. *Microanalysis.*—Calculated: C, 64.5, H, 9.7. Found: C, 64.3, H, 9.5. The $n_D^{30}$ was 1.4444.

Using similar conditions the compounds in columns A and B are reacted and the product thereof is then epoxidized to produce the epoxyoxacyclobutane compounds set forth in column C.

| A | B | C |
|---|---|---|
| 3-methyloloxacyclobutane. | Allyl bromide. | 3-(2,3-epoxypropyl)oxacyclobutane. |
| 3-(3-hydroxypropyl)oxacyclobutane. | Crotyl chloride. | 3-(2,3-epoxybutoxypropyl)oxacyclobutane. |
| 3-methyloloxacyclobutane. | Methallyl chloride. | 3-(2,3-epoxy-2-methylpropoxymethyl)oxacyclobutane. |
| 3-octyl-3-methyloloxacyclobutane. | Methallyl iodide. | 3-(2,3-epoxy-2-methylpropoxymethyl)-3-octyloxacyclobutane. |
| 3,3-dimethyloloxacyclobutane. | Allyl chloride. | 3-(2,3-epoxypropoxymethyl)-3-methyloloxacyclobutane. |
| Do. | Methallyl chloride. | 3-(2,3-epoxy-2-methylpropoxymethyl)-3-(2-methyl-2-propenyl)oxacyclobutane. |
| Do. | do. | 3-(2,3-epoxy-2-methylpropoxymethyl)-3-methyloloxacyclobutane. |

EXAMPLE 2

A mixture of 1,088 grams of pentaerythritol and 1,056 grams of ethylene carbonate was prepared in a three liter flask that was equipped with a short distillation column and a condenser. The temperature of the mixture was raised to 140° C. and the pressure lowered to 30 mm. of mercury. The ethylene glycol formed during the reaction was continuously removed at a head temperature of 115° C. at 30 mm. pressure to 110° C. at 15 mm. pressure. After a total of 1,000 grams of ethylene glycol, containing a small amount of ethylene carbonate, had distilled, the kettle temperature rose to 180° C. and the reaction mixture began to liberate carbon dioxide by thermal decomposition. During this period, 369 grams of distilate consisting essentially of 3,3-dimethylolacacyclobutane was recoverd. This crude distillate was distilled through an eight inch by 32 mm. column packed with glass helices and 270 grams of pure 3,3-dimethyloloxacyclobutane were obtained having a boiling point of 129° C. at 0.8 mm. of mercury. On cooling the product solidified.

A mixture of 800 grams of 50 percent potassium hydroxide solution and 218 grams of 3,3-dimethyloloxacyclobutane was charged to a three liter creased flask and heated to 70° C. in a nitrogen atmosphere. Over a period of three hours, 724.5 grams of methallyl chloride was added and the mixture was refluxed at 78° C. to 90° C. for 25 hours, then it was cooled and filtered to remove the precipitated potassium chloride. Another 90.6 grams of methallyl chloride was slowly added to the filtrate and the reaction mixture was refluxed for six hours, cooled, filtered and the organic layer separated. The aqueous layer was extracted with two 250 ml. portions of diethyl ether. The ether extracts were combined with the organic layer, washed with 200 ml. of water and then dried over sodium carbonate. The dried solution was stripped of solvent and then fractionally distilled through a 10 mm. by 36 inch column packed with tantalum wire spirals. Two main product fractions were recovered; fraction A consisted of 35 grams of 3-methallyloxymethyl-3-methyloloxacyclobutane and fraction B consisted of 234 grams of a mixture having 37.4 percent free hydroxyl.

Fraction B was charged to a creased flask and heated under nitrogen to 70° C. Over a 30 minute period 11.2 grams of sodium (the theoretically calculated amount) was added in small pieces; a slow evolution of hydrogen occurred. The reaction mixture was stirred at 90° C. for 15 hours, 181 grams of methallyl chloride was added in a dropwise manner, the mixture was refluxed for three hours, stored over a weekend, and then refluxed for another two hours. Residual sodium was killed with about 2.5 grams of methanol and the solution was worked up by ether extraction, washing, and drying, as above, and a fluid, yellow liquid was recovered. Fractional distillation yielded 205 grams of 3,3-dimethallyloxymethyloxacyclobutane at 97° C. at a pressure of 1 mm. of mercury; corresponding to a 49 percent yield based on the 3,3-dimethyloloxacyclobutane charged. The distilled product had an $n_D^{30}$ of 1.4563 and an iodine number of 211; the theoretical iodine number is 221. There was also recovered a 19.5 percent yield of 3-methallyloxymethyl-3-methyloloxacyclobutane boiling at 107° C. at a pressure of 1.2 mm. of mercury; it had an $n_D^{30}$ of 1.4640. *Microanalysis.*—Calculated: C, 62.9, H, 9.4. Found: C, 62.5, H, 9.3.

One hundred and eighty grams of 3,3-dimethallyloxymethyloxacyclobutane was placed in a two liter flask equipped with thermometer, condenser, stirer, and dropping funnel; this was heated to 35° C. and 650 grams of a 23 percent solution of peracetic acid in ethyl acetate was added over a two hour period at about 35° C. The reaction mixture was stirred at 25° C. for another hour and then stored overnight at —5° C. The next day the reaction mixture was stirred at 35° C. for four hours and then added dropwise to a still kettle containing 800 grams of ethylbenzene refluxing at a pressure of 25 mm. of mercury. In this manner ethyl acetate, acetic acid, peracetic acid and ethylbenzene were removed as the distillate and 210 grams of bis-3,3-(2,3-epoxy-2-methylpropoxymethyl)oxacyclobutane was recovered as a residue. This residue was fractionally distilled through a 32 mm. by 8 inch glass packed column with the purified bis-3,3-(2,3 - epoxy - 2 - methylpropoxymethyl)oxacyclobutane fraction coming through at from 147° C. at 1.5 mm. of mercury to 123° C. at 0.07 mm. of mercury. The purified compound had an $n_D^{30}$ of 1.4574. *Microanalysis.*—Calculated: C, 60.4, H, 8.6. Found: C, 60.2, H, 8.3.

Using similar conditions the compounds in columns A and B are reacted and the product thereof is then epoxidized to produce the epoxyoxacyclobutane compounds set forth in column C.

| A | B | C |
|---|---|---|
| 3,3-dimethyloloxacyclobutane. | Allyl chloride. | Bis-3,3-(2,3-epoxypropoxymethyl)oxacyclobutane. |
| Do. | Allyl bromide methallyl bromide. | 3-(2,3-epoxypropoxymethyl)-3-(2,3-epoxy-2-methylpropoxymethyl)oxacyclobutane. |
| Do. | 3-hexenyl chloride. | Bis-3,3-(2,3-epoxyhexyloxymethyl)oxacyclobutane. |
| Do. | 3-octenyl chloride. | Bis-3,3-(2,3-epoxyoctyloxymethyl)oxacyclobutane. |

EXAMPLE 3

A solution of 500 grams of pyridine and 199 grams of 1,1-dimethylol-3-cyclohexene was cooled to 10° C.

and 301 grams of p-toluenesulfonyl chloride was added in small portions. The solution was allowed to warm to room temperature and stored over the weekend. Distillation yielded 387 grams of the crude tosylate salt as an oily product; this was used without further purification. The tosylate was added at room temperature to a solution of 165 grams of potassium hydroxide in 200 ml. of water and 200 grams of ethanol. After about 20 hours at room temperature, the mixture was refluxed for about 30 minutes, cooled, 800 grams of water was added and the organic lyer was separated. The water layer was extracted with three 250 ml. portions of diethyl ether. The extracts were combined with the organic layer, dried over sodium carbonate, filtered, stripped, and fractionally distilled twice. There was obtained 67 grams of spiro [3,5]-2-oxa-7-nonene boiling at 85.5° C. at 36 mm. of mercury pressure and having an $n_D^{30}$ of 1.4791.

A mixture of 65 grams of spiro[3,5]-2-oxa-7-nonene and 185 grams of a 23.6 percent solution of peracetic acid in ethyl acetate was prepared by adding the peracetic acid solution to the spiro compound, and it was allowed to react at room temperature for 8 hours. The reaction mixture was then fractionally distilled and 52 grams of 7,8-epoxyspiro[3,5]-2-oxanonane was obtained boiling at 79° C. at a pressure of 3 mm. of mercury; this compound had an $n_D^{30}$ of 1.4835. *Microanalysis.*—Calculated: C, 68.5, H, 8.6. Found: C, 68.5; H, 8.4.

Using similar conditions the tosylate salts of the compounds in column A are produced and they are then epoxidized to produce the epoxyoxacyclobutane compounds set forth in column B.

| A | B |
|---|---|
| 1,1-dimethylol-3-methyl-3-cyclohexene. | 7,8-epoxy-7-methylspiro[3,5]-2-oxanonane. |
| 1,1-dimethylol-4-phenyl-3-cyclohexene. | 7,8-epoxy-8-phenylspiro[3,5]-2-oxanonane. |
| 1,1-dimethylol-3,4-dimethylcyclohexene. | 7,8-epoxy-7,8-dimethylspiro[3,5]-2-oxanonane. |
| 1,1-dimethylol-2-cyclopentene. | 6,7-epoxyspiro[3,4]-2-oxaoctane. |

EXAMPLE 4

A mixture of 27.3 grams of 3-methallyloxymethyl-3-methyloloxacyclobutane from Example 2 and 53.5 grams of a 24.1 percent solution of peracetic acid in ethyl acetate was prepared by adding the peracetic acid solution to the substituted oxacyclobutane compound at room temperature and stored at room temperature for about 36 hours. The reaction mixture was fractionally distilled and 21 grams of 3-methylol-3-(2,3-epoxy-2-methylpropoxymethyl)oxacyclobutane was obtained boiling at 142° C. at a pressure of 1.5 mm. of mercury; it had an $n_D^{30}$ of 1.4633. *Microanalysis.*—Calculated: C, 57.4, H, 8.6. Found: C, 57.7, H, 8.4.

Using similar conditions the compounds in columns A and B are reacted and the product thereof is then epoxidized to produce the epoxyoxacyclobutane compounds set forth in column C.

| A | B | C |
|---|---|---|
| 3,3-dimethyloloxacyclobutane. | Crotyl chloride. | 3-(2,3-epoxybutoxymethyl)-3-hydroxymethyloxacyclobutane. |
| 3,3-di(3-hydroxypropyl)oxacyclobutane. | ......do.............. | 3-(2,3-epoxybutoxypropyl)-3-(3-hydroxypropyl)oxacyclobutane. |

EXAMPLES 5–7

The 3-(2,3-epoxy-2-methylpropoxymethyl)-3-ethyloxacyclobutane, 0.9 gram, was placed in a test tube and the hardener was added. The mixtures were then heated and the epoxide resins that were produced were examined. The pertinent data is tabulated below:

| Ex. | Hardener | Gram | Heating Conditions | Resin Description |
|---|---|---|---|---|
| 5 | BFM | 0.1 | 1 hr. at 160° C. / 21 hrs. at 120° C. / 7 hrs. at 160° C. | Amber, tough. |
| 6 | SAG | 0.9 | 38 hrs. at 120° C. / 6 hrs. at 160° C. | Pale yellow, tough and flexible. |
| 7 | PA | 0.74 | 31 hrs. at 120° C. / 6 hrs. at 160° C. | Amber, tough. |

BFM—Boron trifluoride monoethylamine complex.
SAG—Succinic anhydride adduct of glycerol (U.S. 2,921,925, Ex. 16, Table III).
PA—Phthalic anhydride.

EXAMPLES 8–14

The bis-3,3-(2,3-epoxy-2-methylpropoxymethyl)oxacyclobutane, 0.9 gram, was placed in a test tube and the hardener was added. The mixtures were then heated and the epoxide resins that were produced were examined. The pertinent data is tabulated below:

| Ex. | Hardener | Gram | Heating Conditions | Resin Description |
|---|---|---|---|---|
| 8 | AA | 0.44 | 6.25 hrs. at 120° C. / 6 hrs. at 160° C. | Clear, tough, Barcol-8. |
| 9 | PA | 0.74 | 5.5 hrs. at 120° C. / 6 hrs. at 160° C. | Amber, brittle. |
| 10 | DETA | 0.22 | 25 hrs. at 26° C. / 6.5 hrs. at 80° C. / 7 hrs. at 130° C. / 6 hrs. at 160° C. | Light yellow, tough, Barcol-22. |
| 11 | MEDA | 0.5 | 7 hrs. at 120° C. / 6 hrs. at 160° C. | Amber, tough, Barcol-40. |
| 12 | KOH (15%) | 0.035 | 7 hrs. at 120° C. / 6 hrs. at 160° C. | Amber, tough, Barcol-32. |
| 13 | BFM | 0.05 | 6 hrs. at 120° C. | Opaque amber, brittle. |
| 14 | SAG | 0.72 | 5.5 hrs. at 120° C. / 6 hrs. at 160° C. | Light yellow, tough. |

AA—Adipic acid.
PA—Phthalic anhydride.
DETA—Diethylenetriamine.
MEDA—Methylenedianiline.
BFM—Boron trifluoride monoethylamine complex.
SAG—Succinic anhydride adduct of glycerol (U.S. 2,921,925).

EXAMPLES 15–21

The 7,8-epoxyspiro[3,5]-2-oxanonane, 0.7 gram, was placed in a test tube and the hardener was added. The mixtures were then heated and the epoxide resins that were produced were examined. The pertinent data is tabulated below:

| Ex. | Hardener | Gram | Heating Conditions | Resin Description |
|---|---|---|---|---|
| 15 | DETA | 0.22 | 14.5 hrs. at 120° C. / 8 hrs. at 160° C. | Light amber, brittle. |
| 16 | PA | 0.74 | 14.5 hrs. at 120° C. / 6 hrs. at 160° C. | Pale yellow, tough, Barcol-8. |
| 17 | AA | 0.44 | 5 hrs. at 160° C. / 14.5 hrs. at 120° C. / 8 hrs. at 160° C. | Clear, brittle. |
| 18 | BFM | 0.07 | 14.5 hrs. at 120° C. / 8 hrs. at 160° C. | Opaque dark amber, brittle. |
| 19 | KOH (15%) | 0.035 | 14.5 hrs. at 120° C. / 8 hrs. at 160° C. | Amber, brittle. |
| 20 | H₂SO₄ (5%) | 1 drop | 1 hr. at 26° C. / 13.5 hrs. at 120° C. / 8 hrs. at 160° C. | Black, brittle. |
| 21 | ZF | 1 drop | 1 hr. at 26° C. / 13.5 hrs. at 120° C. / 8 hrs. at 160° C. | Dark amber, brittle. |

DETA—Diethylenetriamine.
PA—Phthalic anhydride.
AA—Adipic acid.
BFM—Boron trifluoride monoethylamine complex.
ZF—Zinc fluoroborate, 40% solution.

In Examples 5 to 21 the heating conditions are set forth without breakdown of the period of time that the reaction mixture was heated to produce the curable, fusible thermoplastic resin that is subsequently cured by further heating to form the cured thermoset epoxide resin. It is known to those skilled in the art that an epoxide monomer when mixed with an organic hardener will react to form a curable epoxide resin; the period of reaction time required depending upon the particular reactants employed. It is also known that the curable resin can then be cured to a thermoset epoxide resin by further heating.

What is claimed is:

1. The epoxyoxacyclobutanes of the formula

wherein R, when taken singly, is a member selected from the group consisting of hydrogen, alkyl having from 1 to 8 carbon atoms, hydroxyl-substituted alkyl having from 1 to 8 carbon atoms, alkenyl having from 2 to 8 carbon atoms, $C_nH_{2n}—O—C_mH_{2m}—$,

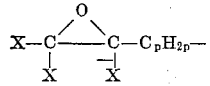

and

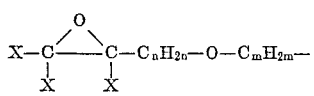

X is a member selected from the group consisting of hydrogen, alkyl having from 1 to about 8 carbon atoms, cycloalkyl having from 5 to 6 ring carbon atoms, and aryl; $p$ is an integer having a value of from 0 to 8; $n$ is an integer having a value of from 1 to 8; $m$ is an integer having a value of from 1 to 4; R', when taken singly, is a member selected from the group consisting of

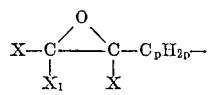

and

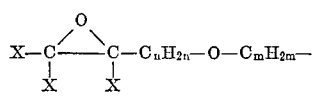

2. The compound 3-(2,3-epoxy-2-methylpropoxymethyl)-3-ethyloxacyclobutane.

3. The compound bis-3,3-(2,3-epoxy-2-methylpropoxymethyl)oxacyclobutane.

4. The compound 3-methylol-3-(2,3-epoxy-2-methylpropoxymethyl)oxacyclobutane.

5. Poly(epoxyoxacyclobutane) of the formula

wherein R, when taken singly, is a member selected from the group consisting of hydrogen, alkyl having from 1 to 8 carbon atoms, hydroxyl-substituted alkyl having from 1 to 8 carbon atoms, alkenyl having from 2 to 8 carbon atoms, $C_nH_{2n}—OC_mH_{2m}—$,

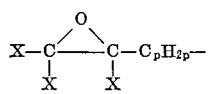

and

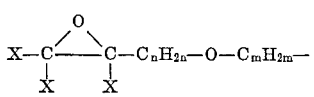

X is a member selected from the group consisting of hydrogen, alkyl having from 1 to about 8 carbon atoms, cycloalkyl having from 5 to 6 ring carbon atoms, and aryl; $p$ is an integer having a value of from 0 to 8; $n$ is an integer having a value of from 1 to 8; $m$ is an integer having a value of from 1 to 4; R, when taken singly, is a member selected from the group consisting of

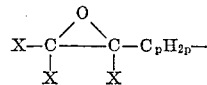

and

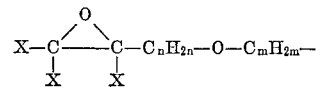

6. Poly(epoxyoxacyclobutane) of the formula

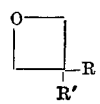

wherein R, when taken singly, is a member selected from the group consisting of hydrogen, alkyl having from 1 to 8 carbon atoms, hydroxyl-substituted alkyl having from 1 to 8 carbon atoms, alkenyl having from 2 to 8 carbon atoms, $C_nH_{2n}—O—C_mH_{2m}—$,

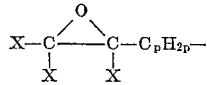

and

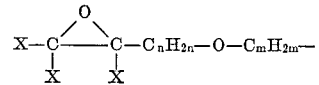

X is a member selected from the group consisting of hydrogen, alkyl having from 1 to about 8 carbon atoms, cycloalkyl having from 5 to 6 ring carbon atoms, and aryl; $p$ is an integer having a value of from 0 to 8; $n$ is an integer having a value of from 1 to 8; $m$ is an integer having a value of from 1 to 4; R', when taken singly, is a member selected from the group consisting of

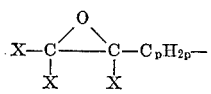

and

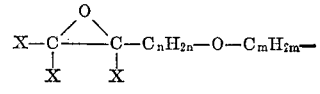

7. Poly(3-(2,3 - epoxy - 2 - methylpropoxymethyl)-3-ethyloxacyclobutane).

8. Poly{3-(2,3 - epoxy - 2 - methylpropoxymethyl)-3-ethyloxacyclobutane} and an active organic hardener in an amount to provide from 0.1 to 5 of the reactive group in the hardener per epoxy group.

9. Poly(bis-3,3,-(2,3-epoxy - 2 - methylpropoxymethyl) oxacyclobutane).

10. Poly(bis-3,3,-(2,3-epoxy - 2 - methylpropoxymethyl)oxacyclobutane and an active organic hardener in an amount to provide from 0.1 to 5 of the reactive group in the hardener per epoxy group.

11. Poly(3-methylol-3-(2,3-epoxy - 2 - methylpropoxymethyl)oxacyclobutane).

12. Poly(3-methylol-3-(2,3-epoxy - 2 - methylpropoxymethyl)oxacyclobutane and an active organic hardener in an amount to provide from 0.1 to 5 of the reactive group in the hardener per epoxy group.

References Cited

UNITED STATES PATENTS 2,977,374   3/1961   Phillips et al.
3,110,688   11/1963  Campbell _____ 260—20 X WILLIAM H. SHORT, Primary Examiner
T. PERTILLA, Assistant Examiner U.S. Cl. X.R.
117—161; 260—78.4, 88.3, 348; 161—184

PO-1050
(5/69)

UNITED STATES PATENT OFFICE
CERTIFICATE OF CORRECTION

Patent No. 3,457,193    Dated July 22, 1969

Inventor(s) S. W. Tinsley and P. A. King

It is certified that error appears in the above-identified patent and that said Letters Patent are hereby corrected as shown below:

Column 13, line 37, "$X_1$" should be --- X ---.

Column 14, line 59, insert at the end of claim 6, --- and an active organic hardener in an amount to provide from 0.1 to 5 of the reactive groups in the hardener per epoxy group. ---

SIGNED AND
SEALED
NOV 18 1969

(SEAL)
Attest:

Edward M. Fletcher, Jr.
Attesting Officer

WILLIAM E. SCHUYLER, JR.
Commissioner of Patents